US011102113B2

(12) United States Patent
Liebherr et al.

(10) Patent No.: US 11,102,113 B2
(45) Date of Patent: Aug. 24, 2021

(54) MAPPING OF INTERNET PROTOCOL ADDRESSES IN A MULTI-CLOUD COMPUTING ENVIRONMENT

(71) Applicant: SAP SE, Walldorf (DE)

(72) Inventors: Wolf Liebherr, Bruchsal (DE);
Christian Gross, Sunnyvale, CA (US);
Stephan Heusch, Berlin (DE)

(73) Assignee: SAP SE, Walldorf (DE)

( * ) Notice: Subject to any disclaimer, the term of this patent is extended or adjusted under 35 U.S.C. 154(b) by 65 days.

(21) Appl. No.: 16/184,635

(22) Filed: Nov. 8, 2018

(65) Prior Publication Data

US 2020/0153736 A1   May 14, 2020

(51) Int. Cl.
*H04L 12/46* (2006.01)
*H04L 12/741* (2013.01)
*H04L 29/12* (2006.01)
*H04L 29/08* (2006.01)

(52) U.S. Cl.
CPC .......... *H04L 45/74* (2013.01); *H04L 12/4641* (2013.01); *H04L 61/2007* (2013.01); *H04L 67/10* (2013.01); *H04L 61/2514* (2013.01); *H04L 61/2592* (2013.01); *H04L 61/6068* (2013.01)

(58) Field of Classification Search
None
See application file for complete search history.

(56) References Cited

U.S. PATENT DOCUMENTS

| 6,145,126 | A | * | 11/2000 | Matsukura | ................ | G06F 8/61 709/201 |
| 6,201,962 | B1 | * | 3/2001 | Sturniolo | .............. | H04W 36/18 455/432.2 |
| 7,953,070 | B1 | * | 5/2011 | Agarwal | ............ | H04M 7/0078 370/352 |
| 7,974,201 | B1 | * | 7/2011 | Daruwalla | .......... | H04L 12/2801 370/235 |
| 8,050,192 | B2 | * | 11/2011 | Park | .................... | H04L 12/2803 370/254 |
| 9,560,016 | B2 | * | 1/2017 | Zhang | ................. | H04L 63/0272 |
| 10,484,334 | B1 | * | 11/2019 | Lee | ...................... | H04L 63/0245 |
| 2002/0186698 | A1 | * | 12/2002 | Ceniza | ................ | H04L 12/4641 370/401 |

(Continued)

*Primary Examiner* — Bunjob Jaroenchonwanit
(74) *Attorney, Agent, or Firm* — Mintz Levin Cohn Ferris Glovsky and Popeo, P.C.

(57) ABSTRACT

A method for interconnecting two or more virtual private networks in a hybrid multi-cloud computing environment. The method may include remapping a first virtual private network to a first Internet Protocol address range that does not overlap with a second Internet Protocol address range of a second virtual private network. The remapping may include assigning, to a first endpoint in the first virtual private network, a first Internet Protocol address that differs from a second Internet Protocol address of a second endpoint in the second virtual private network. Traffic between the first virtual private network, the second virtual private network, and/or a third virtual private network may be routed based at least on the first Internet Protocol address range and the second Internet Protocol address range. Related systems and articles of manufacture, including computer program products, are also provided.

16 Claims, 5 Drawing Sheets

(56) References Cited

U.S. PATENT DOCUMENTS

| | | | | |
|---|---|---|---|---|
| 2007/0248091 | A1* | 10/2007 | Khalid | H04L 63/0272 |
| | | | | 370/392 |
| 2008/0010489 | A1* | 1/2008 | Kawamoto | G06F 11/1076 |
| | | | | 714/4.1 |
| 2010/0322186 | A1* | 12/2010 | Kang | H04W 36/0011 |
| | | | | 370/331 |
| 2011/0110377 | A1* | 5/2011 | Alkhatib | H04L 29/12349 |
| | | | | 370/395.53 |
| 2013/0185651 | A1* | 7/2013 | Wionzek | H04L 67/24 |
| | | | | 715/753 |
| 2013/0343175 | A1* | 12/2013 | Kini | H04L 61/2061 |
| | | | | 370/219 |
| 2014/0068223 | A1* | 3/2014 | Quintard | G06F 12/0653 |
| | | | | 711/203 |
| 2015/0036641 | A1* | 2/2015 | Eichen | H04L 12/4633 |
| | | | | 370/329 |
| 2015/0043350 | A1* | 2/2015 | Basilier | H04L 63/0272 |
| | | | | 370/235 |
| 2016/0105312 | A1* | 4/2016 | Edwards | G06Q 10/10 |
| | | | | 709/222 |
| 2018/0062917 | A1* | 3/2018 | Chandrashekhar | |
| | | | | G06F 11/2035 |
| 2018/0337854 | A1* | 11/2018 | Cohn | H04L 45/586 |

* cited by examiner

MAPPING OF INTERNET PROTOCOL ADDRESSES IN A MULTI-CLOUD COMPUTING ENVIRONMENT

FIELD

The present disclosure generally relates to cloud computing and, more specifically, to Internet Protocol address mapping in a multi-cloud computing environment.

BACKGROUND

In a cloud computing environment, multiple tenants may be served by a shared pool of computing resources including, for example, computer networks, servers, storage, applications, services, and/or the like. The cloud-computing environment may have a multi-cloud architecture in which the shared pool of computing resources are hosted by several cloud providers. Moreover, the cloud computing environment may be a hybrid cloud computing environment that includes a mix of private cloud providers and public cloud providers.

SUMMARY

Methods, systems, and articles of manufacture, including computer program products, are provided for mapping Internet Protocol (IP) addresses in a multi-cloud computing environment. In some implementations of the current subject matter, there is provided a system. The system can include at least one data processor. The system can further include at least one memory storing instructions that result in operations when executed by the at least one data processor. The operations can include: remapping a first virtual private network to a first Internet Protocol address range that does not overlap with a second Internet Protocol address range of a second virtual private network, the remapping including assigning, to a first endpoint in the first virtual private network, a first Internet Protocol address that differs from a second Internet Protocol address of a second endpoint in the second virtual private network; and routing, based at least on the first Internet Protocol address range and the second Internet Protocol address range, traffic between the first virtual private network, the second virtual private network, and/or a third virtual private network.

In some variations, one or more of the features disclosed herein including the following features can optionally be included in any feasible combination. The third virtual private network may be associated with a third Internet Protocol address range that overlaps with the first Internet Protocol address range and/or the second Internet Protocol address range. The third virtual private network may be remapped from the third Internet Protocol address range to a fourth Internet Protocol address range. The fourth Internet Protocol address range may have no overlap with the first Internet Protocol address range or the second Internet Protocol address range.

In some variations, the remapping to the first Internet Protocol address range and the remapping to the fourth Internet Protocol address range enable a routing of traffic between endpoints in the first virtual private network, the second virtual private network, the third virtual private network, and a fourth virtual private network. The first virtual private network may be remapped to the first Internet Protocol address range and the third virtual private network may be remapped to the fourth Internet Protocol address range in order to interconnect the first virtual private network, the second virtual private network, and the third virtual private network.

In some variations, the first endpoint in the first virtual private network and the second endpoint in the second virtual private network may share a same Internet Protocol address prior to the remapping.

In some variations, the remapping may enable the first endpoint in the first virtual private network and the second endpoint in the second virtual private network to consume a service corresponding to a third endpoint in the third virtual private network.

In some variations, the first virtual private network may be deployed on a first cloud platform. The second virtual private network may be deployed on a second cloud platform. The first cloud platform and/or the second cloud platform may include private cloud computing platforms deployed on on-premise cloud infrastructure and/or public cloud computing platforms deployed on third-party cloud infrastructure.

In some variations, the first cloud platform and/or the second cloud platform may be configured to provide infrastructure-as-a-service.

In another aspect, there is provided a method for mapping Internet Protocol (IP) addresses in a multi-cloud computing environment. The method may include: remapping a first virtual private network to a first Internet Protocol address range that does not overlap with a second Internet Protocol address range of a second virtual private network, the remapping including assigning, to a first endpoint in the first virtual private network, a first Internet Protocol address that differs from a second Internet Protocol address of a second endpoint in the second virtual private network; and routing, based at least on the first Internet Protocol address range and the second Internet Protocol address range, traffic between the first virtual private network, the second virtual private network, and/or a third virtual private network.

In some variations, one or more of the features disclosed herein including the following features can optionally be included in any feasible combination. The third virtual private network may be associated with a third Internet Protocol address range that overlaps with the first Internet Protocol address range and/or the second Internet Protocol address range. The method may further include remapping the third virtual private network from the third Internet Protocol address range to a fourth Internet Protocol address range. The fourth Internet Protocol address range may have no overlap with the first Internet Protocol address range or the second Internet Protocol address range.

In some variations, the remapping to the first Internet Protocol address range and the remapping to the fourth Internet Protocol address range enable a routing of traffic between endpoints in the first virtual private network, the second virtual private network, the third virtual private network, and a fourth virtual private network. The first virtual private network may be remapped to the first Internet Protocol address range and the third virtual private network may be remapped to the fourth Internet Protocol address range in order to interconnect the first virtual private network, the second virtual private network, and the third virtual private network.

In some variations, the first endpoint in the first virtual private network and the second endpoint in the second virtual private network may share a same Internet Protocol address prior to the remapping.

In some variations, the remapping may enable the first endpoint in the first virtual private network and the second endpoint in the second virtual private network to consume a service corresponding to a third endpoint in the third virtual private network.

In some variations, the first virtual private network may be deployed on a first cloud platform. The second virtual private network may be deployed on a second cloud platform. The first cloud platform and/or the second cloud platform may include private cloud computing platforms deployed on on-premise cloud infrastructure and/or public cloud computing platforms deployed on third-party cloud infrastructure.

In another aspect, there is provided a computer program product that includes a non-transitory computer readable medium. The non-transitory computer readable medium may store instructions that cause operations when executed by at least one data processor. The operations may include: remapping a first virtual private network to a first Internet Protocol address range that does not overlap with a second Internet Protocol address range of a second virtual private network, the remapping including assigning, to a first endpoint in the first virtual private network, a first Internet Protocol address that differs from a second Internet Protocol address of a second endpoint in the second virtual private network; and routing, based at least on the first Internet Protocol address range and the second Internet Protocol address range, traffic between the first virtual private network, the second virtual private network, and/or a third virtual private network.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to mapping Internet Protocol addresses in a multi-cloud computing environment, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
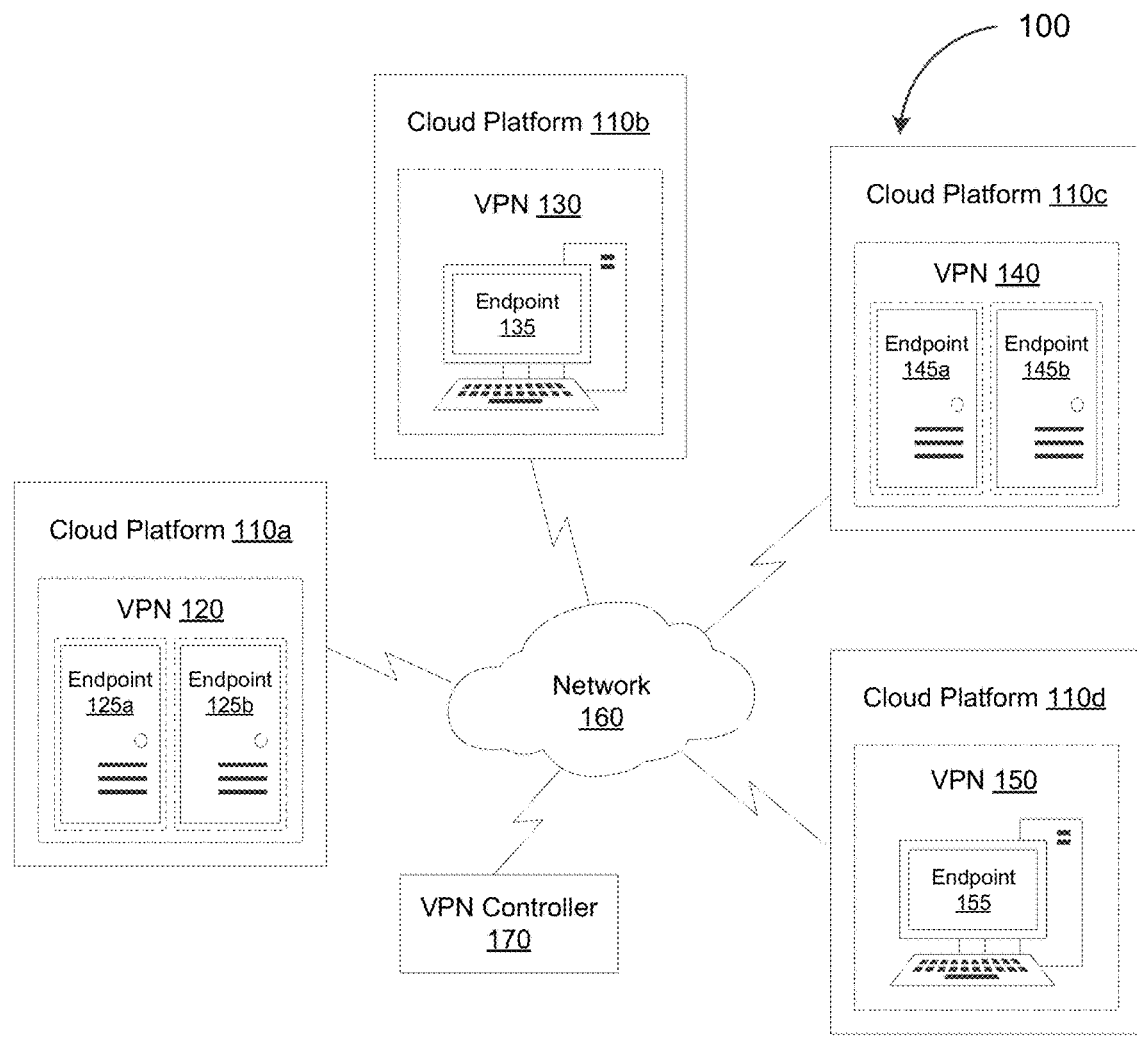
FIG. 1 depicts a system diagram illustrating a hybrid multi-cloud computing system, in accordance with some example embodiments.

Like labels are used to refer to same or similar items in the drawings.

DETAILED DESCRIPTION

A hybrid multi-cloud computing environment may include a shared pool of computing resources hosted by multiple cloud providers including, for example, private cloud providers, public cloud providers, and/or the like. As such, the hybrid multi-cloud computing environment may include a multitude of individual private cloud computing platforms deployed on on-premise cloud infrastructures as well as public cloud computing platforms deployed on third-party cloud infrastructures. Moreover, these private cloud computing platforms and public cloud computing platforms may support the creation of one or more user-defined, virtual private networks (VPNs). The operations of the hybrid multi-cloud computing environment may require endpoints from one virtual private network to interact with endpoints that are part of another virtual private network.

Two or more virtual private networks may be interconnected in order for endpoints from one virtual private network to interact with endpoints from another virtual private network. Interconnection between two or more virtual private networks may be feasible if the Internet Protocol (IP) address ranges of the virtual private networks do not overlap. Where the IP address ranges of two or more virtual private networks do overlap, interconnecting the virtual private networks may require the virtual private networks to be redeployed using unique, non-overlapping IP address ranges. However, this conventional solution may be impracticable because redeploying the virtual private networks may be time and/or cost prohibitive. As such, in some example embodiments, a virtual private network controller may be configured to remap two or more interconnected virtual private networks to unique, non-overlapping Internet Protocol address ranges. The virtual private network controller may be further configured to route traffic from a first endpoint in a first virtual private network to a second endpoint in a second virtual private network based on the Internet Protocol addresses of the first entity and the second entity.

FIG. 1 depicts a system diagram illustrating a multi-cloud computing system 100, in accordance with some example embodiments. Referring to FIG. 1, the multi-cloud computing system 100 may include a hybrid multi-cloud environment having multiple cloud-computing platforms hosted on private, on premise cloud infrastructures as well as public, third-party cloud infrastructures. For example, as shown in FIG. 1, the multi-cloud computing system 100 may include a first cloud platform 110a, a second cloud platform 110b, a third cloud platform 110c, and a fourth cloud platform 110d. The first cloud platform 110a, the second cloud platform 110b, the third cloud platform 110c, and/or the fourth cloud platform 110d may be public cloud platforms deployed on public, third-party cloud infrastructure. Alternatively and/or additionally, the first cloud platform 110a, the second cloud platform 110b, the third cloud platform 110c, and/or the fourth cloud platform 110d may be private cloud platforms deployed on private, on premise cloud infrastructure. As shown in FIG. 1, the first cloud platform 110a, the second cloud platform 110b, the third cloud platform 110c, and the fourth cloud platform 110d may be communicatively coupled via a network 160, which may be any wired and/or wireless network including, for example, a local area network (LAN), a wide area network (WAN), a public land mobile network (PLMN), the Internet, and/or the like.

In some example embodiments, the first cloud platform 110a, the second cloud platform 110b, the third cloud platform 110c, and/or the fourth cloud platform 110d may each provide a variety of services. For example, the first cloud platform 110a, the second cloud platform 110b, the third cloud platform 110c, and/or the fourth cloud platform 110d may provide infrastructure-as-a-service (IaaS), thereby enabling the creation of multiple virtual private networks (VPNs), including, for example, a first virtual private network 120, a second virtual private network 130, a third virtual private network 140, and/or a fourth virtual private network 150. However, it should be appreciated that the first cloud platform 110a, the second cloud platform 110b, the third cloud platform 110c, and/or the fourth cloud platform 110d may provide additional services including, for example, software-as-a-service (SaaS), platform-as-a-service (PaaS), and/or the like.

The first virtual private network 120, the second virtual private network 130, the third virtual private network 140, and the fourth virtual private network 150 may each include one or more endpoints. For example, as shown in FIG. 1, the first virtual private network 120 may include a first endpoint 125a and a second endpoint 125b while the second virtual private network 130 may include a third endpoint 135. Alternatively and/or additionally, the third virtual private network 140 may include a fourth endpoint 145a and a fifth endpoint 145b while the fourth virtual private network 150 may include a sixth endpoint 155. As used herein, an endpoint may refer to any entity within a virtual private network including, for example, a host, a client, a service, a virtual appliance, and/or the like. An authenticated secure channel known as a virtual private network (VPN) tunnel may be established between two endpoints in the same virtual private network or two endpoints from different virtual private networks. The establishment of a virtual private network tunnel between endpoints from different virtual private networks may require an interconnection between the virtual private networks. As noted, interconnecting two or more virtual private networks may require the virtual private networks to be associated with unique, non-overlapping Internet Protocol address ranges. That is, no two endpoints in the two or more interconnected virtual private networks may be associated with a same Internet Protocol address.

In some example embodiments, the first virtual private network 120, the second virtual private network 130, the third virtual private network 140, and the fourth virtual private network 150 shown in FIG. 1 may be interconnected. For example, the sixth endpoint 155 in the fourth virtual private network 150 may correspond to a service that is consumed by the first endpoint 125a and the second endpoint 125b in the first virtual private network 120, the third endpoint 135 in the second virtual private network 130, and the fourth endpoint 145a and the fifth endpoint 145b in the third virtual private network 140.

Interconnecting the first virtual private network 120, the second virtual private network 130, the third virtual private network 140, and the fourth virtual private network 150 in this manner may require the first virtual private network 120, the second virtual private network 130, the third virtual private network 140, and/or the fourth virtual private network 150 to be associated with non-overlapping Internet Protocol address ranges. In the corresponding address space, the first endpoint 125a, the second endpoint 125b, the third endpoint 135, the fourth endpoint 145a, the fifth endpoint 145b, and the sixth endpoint 155 may each associated with a unique Internet Protocol address. That is, the Internet Protocol address of one endpoint in one virtual private network may not collide with the Internet Protocol address of another endpoint in a different virtual private network. Collision between the Internet Protocol addresses of endpoints occupying different virtual private networks may prevent the proper routing of traffic between two or more interconnected virtual private networks.

In some example embodiments, to prevent the first virtual private network 120, the second virtual private network 130, the third virtual private network 140, and/or the fourth virtual private network 150 from being associated with overlapping Internet Protocol address ranges, the multi-cloud computing system 100 may include a virtual private network (VPN) controller 170. As shown in FIG. 1, the virtual private network (VPN) controller 170 may be communicatively coupled, via the network 160, with the first cloud platform 110a, the second cloud platform 110b, the third cloud platform 110c, and/or the fourth cloud platform 110d. Moreover, the virtual private network (VPN) controller 170 may be configured to remap the first virtual private network 120, the second virtual private network 130, the third virtual private network 140, and/or the fourth virtual private network 150 to non-overlapping Internet Protocol address ranges. As used herein, an Internet Protocol address may refer to any version of Internet Protocol address including, for example, an Internet Protocol Version 4 (IPv4) address, an Internet Protocol Version 6 (IPv6) address, and/or the like.

Remapping the first virtual private network 120, the second virtual private network 130, the third virtual private network 140, and/or the fourth virtual private network 150 to non-overlapping Internet Protocol address ranges may create an address space in which endpoints occupying different virtual private networks are associated with unique Internet Protocol addresses. That is, each of the first endpoint 125a, the second endpoint 125b, the third endpoint 135, the fourth endpoint 145a, the fifth endpoint 145b, and the sixth endpoint 155 may be remapped to a unique Internet Protocol address that does not collide with any other Internet Protocol addresses in the first virtual private network 120, the second virtual private network 130, the third virtual private network 140, and the fourth virtual private network 150. Accordingly, the remapping may prevent two or more endpoints from different virtual private networks from sharing the same Internet Protocol address.

For example, the virtual private network controller 170 may assign, to the first endpoint 125a and the second endpoint 125b in the first virtual private network 120, Internet Protocol addresses that do not collide with the Internet Protocol addresses assigned to the third endpoint 135 in the third virtual private network 130, the fourth endpoint 145*a* in the fourth virtual private network 140, and the fifth endpoint 145*b* in the fifth virtual private network 140. In doing so, the virtual private network controller 170 may ensure that traffic may be properly routed between the first virtual private network 120, the second virtual private network 130, the third virtual private network 140, and the fourth virtual private network 150.

Figure 2:
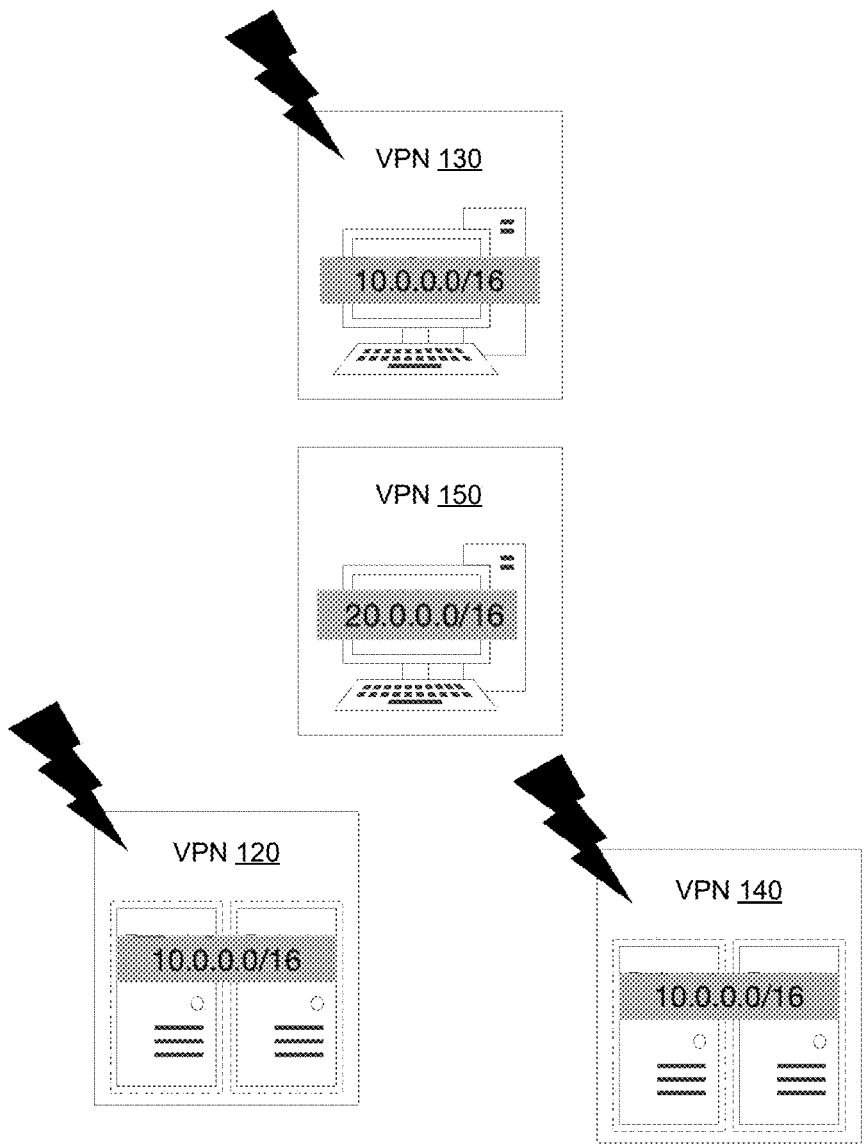
FIG. 2 depicts a block diagram illustrating virtual private networks having overlapping Internet Protocol address ranges, in accordance with some example embodiments.

To further illustrate, FIG. 2 depicts a block diagram illustrating virtual private networks having overlapping Internet Protocol address ranges, in accordance with some example embodiments. As shown in FIG. 2, the first virtual private network 120, the second virtual private network 130, and the third virtual private network 140 may be associated with overlapping Internet Protocol address ranges. For instance, FIG. 2 shows the first virtual private network 120, the second virtual private network 130, and the third virtual private network 140 being associated with the same Internet Protocol address range 10.0.0.0/16. Accordingly, at least some of the endpoints occupying the first virtual private network 120, the second virtual private network 130, and the third virtual private network 140 may be associated with the same Internet Protocol address. For example, the first endpoint 125*a* and/or the second endpoint 125*b* in the first virtual private network 120 may have a same Internet Protocol address as the third endpoint 135 in the second virtual private network 130, the fourth endpoint 145*a* in the fourth virtual private network 140, and/or the fifth endpoint 145*b* in the fourth virtual private network 140. As noted, a collision in the Internet Protocol addresses of endpoints occupying different virtual private networks may prevent a proper routing of traffic between two or more interconnected virtual private networks.

Figure 3:
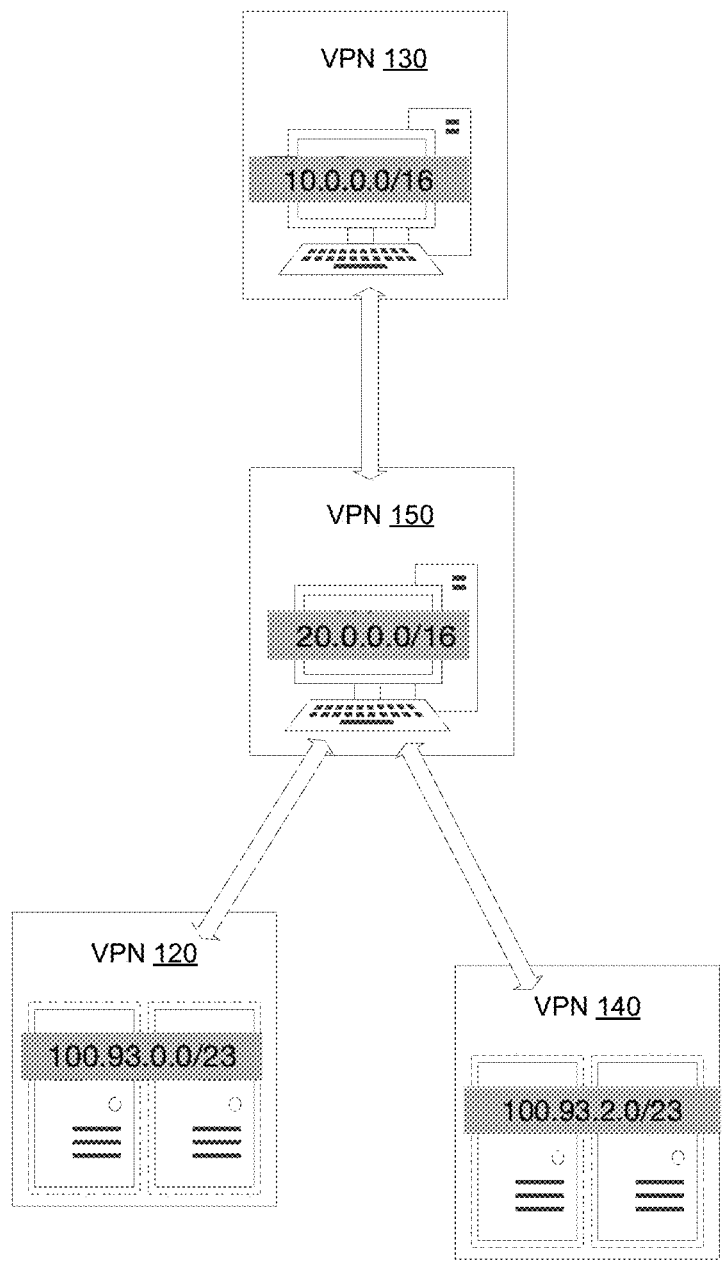
FIG. 3 depicts a block diagram illustrating virtual private network having non-overlapping Internet Protocol address ranges, in accordance with some example embodiments.

By contrast, FIG. 3 depicts a block diagram illustrating virtual private networks having non-overlapping Internet Protocol address ranges, in accordance with some example embodiments. As shown in FIG. 3, the first virtual private network 120 and the third virtual private network 140 may each be assigned a different Internet Protocol address range such that the Internet Protocol address range of the first virtual private network 120 no longer overlaps with the Internet Protocol address range of the third virtual private network 140. Moreover, the Internet Protocol address ranges of the first virtual private network 120 and the third virtual private network 140 may no longer overlap with the Internet Protocol address range of the second virtual private network 130.

For example, the first virtual private network 120 may be assigned the Internet Protocol address range 100.93.0.0/23, which does not overlap with the Internet Protocol address range 10.0.0.0/16 associated with the second virtual private network 130 or the Internet Protocol address range 100.93.2.0/23 associated with the third virtual private network 140. Accordingly, the first endpoint 125*a*, the second endpoint 125*b*, the third endpoint 135, the fourth endpoint 145*a*, and the fifth endpoint 145*b* may each be assigned a different Internet Protocol address. In doing so, the first endpoint 125*a*, the second endpoint 125*b*, the third endpoint 135, the fourth endpoint 145*a*, and the fifth endpoint 145*b* may all be able to consume the service corresponding to the sixth endpoint 155 in the fourth virtual private network 150.

Referring again to FIG. 3, it should be appreciated that the virtual private network controller 170 may only remap the Internet Protocol address ranges of some but not all of the virtual private networks in the multi-cloud computing system 100 in order to obviate overlaps in the Internet Protocol address ranges of the individual virtual private networks within the multi-cloud computing system 100. For example, to remove the overlap in the Internet Protocol address ranges associated with the first virtual private network 120, the second virtual private network 130, and the third virtual private network 140, the virtual private network controller 170 may not be required to remap the Internet Protocol address ranges of the first virtual private network 120, the second virtual private network 130, and the third virtual private network 140. Instead, the virtual private network controller 170 may ensure that the Internet Protocol address ranges of the first virtual private network 120, the second virtual private network 130, and the third virtual private network 140 do not overlap by remapping the first virtual private network 120 and the third virtual private network 140 to non-overlapping Internet Protocol address ranges while keeping the Internet Protocol address range of the second virtual private network 130 unchanged.

In some example embodiments, the virtual private network controller 170 may be further configured to route traffic between the first virtual private network 120, the second virtual private network 130, the third virtual private network 140, and the fourth virtual private network 150. As noted, proper traffic routing between the first virtual private network 120, the second virtual private network 130, the third virtual private network 140, and the fourth virtual private network 150 may be predicated on the first virtual private network 120, the second virtual private network 130, the third virtual private network 140, and the fourth virtual private network 150 being associated with non-overlapping Internet Protocol address ranges. Accordingly, the virtual private network controller 170 may route traffic between the first virtual private network 120, the second virtual private network 130, the third virtual private network 140, and the fourth virtual private network 150 based on the non-overlapping Internet Protocol address ranges that the virtual private network controller 170 has remapped to the first virtual private network 120, the second virtual private network 130, the third virtual private network 140, and the fourth virtual private network 150.

In some example embodiments, the virtual private network controller 170 may be deployed as integrated software and/or a network appliance. Moreover, it should be appreciated that the virtual private network controller 170 may be configured to perform a variety of additional functionalities including, for example, traffic filtering (e.g., on a host level, service level, and/or network level), traffic prioritization (e.g., based on Quality of Service (QoS) metrics, traffic monitoring, service provisioning between interconnected virtual private networks, application-level security filtering (e.g., for web based services), domain name system (DNS) services, and/or the like.

The virtual private network controller 170 may also be configured to perform network address translation (NAT), for example, from a real address space into the address space that has been remapped to avoid overlaps between interconnected virtual private networks. For example, the virtual private network controller 170 may perform network address translation if Internet Protocol Version 4 (IPv4) is used in the first virtual private network 120, the second virtual private network 130, the third virtual private network 140, and/or the fourth virtual private network 150 instead of Internet Protocol Version 6 (IPv6). Alternatively and/or additionally, the virtual private network controller 170 may forward Internet Protocol (IP) connectivity status and/or changes to other network environments including, for example, adjacent cloud computing environments, multi-cloud computing environments, hybrid multi-cloud computing environments, and/or the like. The virtual private network controller 170 may further be configured to serve as a bastion host and/or a jump server for accessing one or more virtual private networks.

Figure 4:
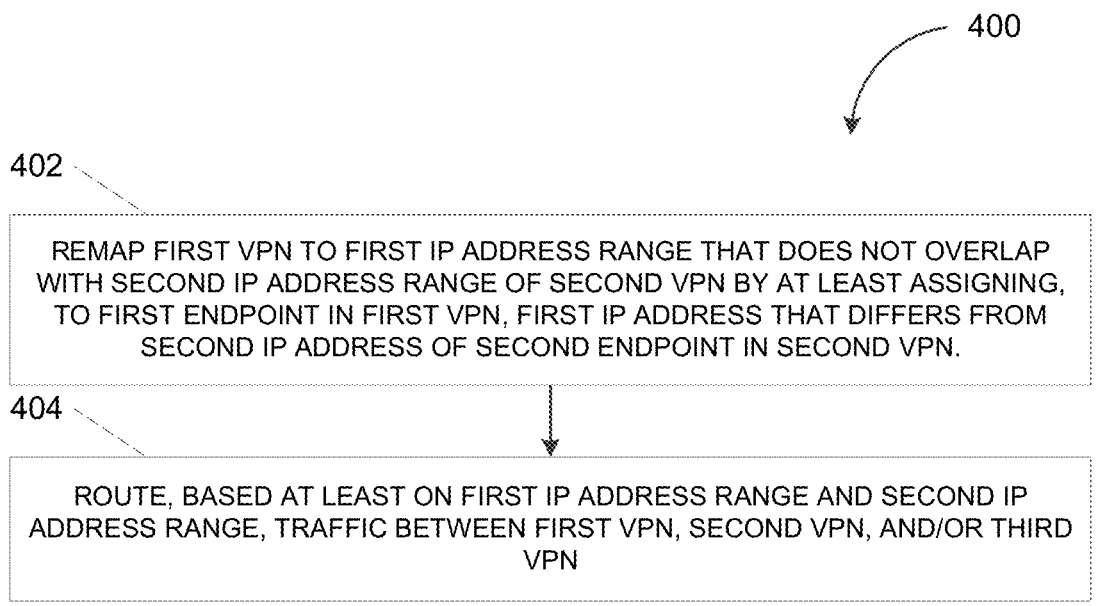
FIG. 4 depicts a flowchart illustrating a process for interconnecting two or more virtual private networks, in accordance with some example embodiments.

FIG. 4 depicts a flowchart illustrating a process 400 for interconnecting two or more virtual private networks, in accordance with some example embodiments. Referring to FIGS. 1-4, the process 400 may be performed by the virtual private network controller 170 in order to enable an interconnection between multiple virtual private networks within the multi-cloud computing system 100 including, for example, the first virtual private network 120, the second virtual private network 130, the third virtual private network 140, and/or the fourth virtual private network 150.

At 402, the virtual private network controller 170 may remap a first virtual private network to a first Internet Protocol address range that does not overlap with a second Internet Protocol address range of a second virtual private network by a least assigning, to a first endpoint in the first virtual private network, a first Internet Protocol address that differs from a second Internet Protocol address of a second endpoint in the second virtual private network. For example, as shown in FIG. 3, the virtual private network controller 170 may remap the first virtual private network 120 and the third virtual private network 140 to non-overlapping Internet Protocol address ranges. The remapping may include assigning the endpoints in the first virtual private network 120 and the second virtual private network 130 to unique Internet Protocol addresses.

In some example embodiments, the virtual private network controller 170 may remap the first virtual private network 120 and the third virtual private network 140 to Internet Protocol address ranges that further do not overlap with the Internet Protocol address range associated with the second virtual private network 130. In doing so, the virtual private network controller 170 may ensure that the first endpoint 125a and/or the second endpoint 125b in the first virtual private network 120 are not associated with a same Internet Protocol address as the third endpoint 135 in the second virtual private network 130, the fourth endpoint 145a in the third virtual private network 140, and/or the fifth endpoint 145b in the third virtual private network 140. As noted, having non-overlapping Internet Protocol address ranges may be a prerequisite for interconnecting the first virtual private network 120, the second virtual private network 130, the third virtual private network 140, and the fourth virtual private network 150 such that the first endpoint 125a, the second endpoint 125b, the third endpoint 135, the fourth endpoint 145a, and the fifth endpoint 145b may all be able to consume the service corresponding to the sixth endpoint 155 in the fourth virtual private network 150.

At 404, the virtual private network controller 170 may route traffic between the first virtual private network, the second virtual private network, and/or a third virtual private network based on the first Internet Protocol address range and the second Internet Protocol address range. For example, in some example embodiments, the virtual private network controller 170 may route traffic between the first virtual private network 120, the second virtual private network 130, the third virtual private network 140, and the fourth virtual private network 150. The virtual private network controller 170 may route traffic associated with the service corresponding to the sixth endpoint 155 in the fourth virtual private network 150 being consumed by the first endpoint 125a in the first virtual private network 120, the second endpoint 125b in the first virtual private network 120, the third endpoint 135 in the second virtual private network 130, the fourth endpoint 145a in the third virtual private network 140, and/or the fifth endpoint 145b in the third virtual private network 140.

As noted, proper traffic routing between the first virtual private network 120, the second virtual private network 130, the third virtual private network 140, and the fourth virtual private network 150 may be predicated on the first virtual private network 120, the second virtual private network 130, the third virtual private network 140, and the fourth virtual private network 150 being associated with non-overlapping Internet Protocol address ranges. Accordingly, the virtual private network controller 170 may route traffic between the first virtual private network 120, the second virtual private network 130, the third virtual private network 140, and the fourth virtual private network 150 based on the non-overlapping Internet Protocol address ranges that the virtual private network controller 170 has remapped to the first virtual private network 120, the second virtual private network 130, the third virtual private network 140, and the fourth virtual private network 150.

For instance, as part of remapping the first virtual private network 120 to the Internet Protocol address range 100.93.0.0/23, the virtual private network controller 170 may assign, to the first endpoint 125a, an Internet Protocol address from the Internet Protocol address range 100.93.0.0/23. Assigning an Internet Protocol address from the Internet Protocol address range 100.93.0.0/23 to the first endpoint 125a may ensure that the Internet Protocol address of the first endpoint 125a does not collide with the Internet Protocol addresses of the third endpoint 135, the fourth endpoint 145a, and the fifth endpoint 145b, which may be selected from different Internet Protocol address ranges (e.g., 10.0.0.0/6 and 100.93.2.0/23) that do not overlap with the Internet Protocol address range 100.93.0.0/23. The virtual private network controller 170 may subsequently route traffic between the first endpoint 125a in the first virtual private network 120 and the sixth endpoint 155 in the fourth virtual private network 150 based on the Internet Protocol address that is assigned to the first endpoint 125a during the remapping.

Figure 5:
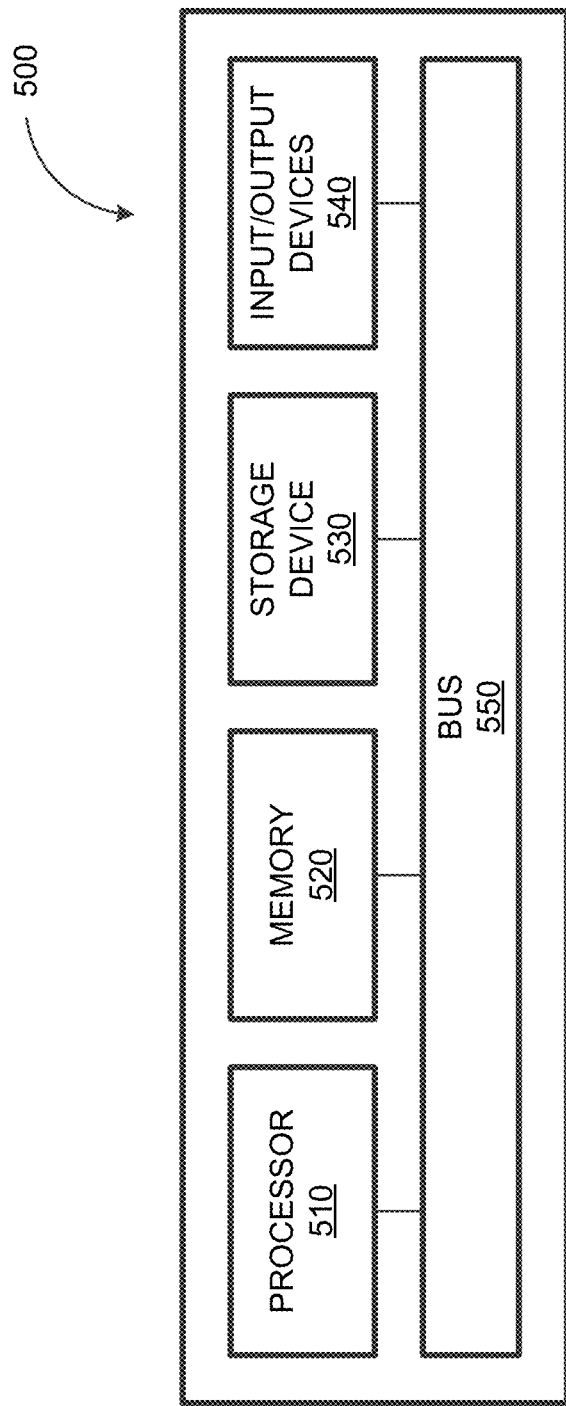
FIG. 5 depicts a block diagram illustrating a computing system consistent with implementations of the current subject matter.

FIG. 5 depicts a block diagram illustrating a computing system 500 consistent with implementations of the current subject matter. Referring to FIGS. 1-5, the computing system 500 can be used to implement the virtual private network controller 170 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the virtual private network controller 170. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include users and servers. A user and server are generally remote from each other and typically interact through a communication network. The relationship of user and server arises by virtue of computer programs running on the respective computers and having a user-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows can include different and/or additional operations than shown without departing from the scope of the present disclosure. One or more operations of the logic flows can be repeated and/or omitted without departing from the scope of the present disclosure. Other implementations can be within the scope of the following claims.

What is claimed is:

1. A system, comprising:
   at least one data processor; and
   at least one memory storing instructions which, when executed by the at least one data processor, result in operations comprising:
      detecting, by a virtual private network controller, an overlap between a first Internet Protocol address range of a first virtual private network and a second Internet Protocol address range of a second virtual private network;

remapping, by the virtual private network controller and in response to detecting the overlap between the first Internet Protocol address range and the second Internet Protocol address range, the first virtual private network to a third Internet Protocol address range that does not overlap with the second Internet Protocol address range of the second virtual private network, the remapping including assigning, by the virtual private network controller to a first endpoint in the first virtual private network, a first Internet Protocol address that differs from a second Internet Protocol address of a second endpoint in the second virtual private network, the first Internet Protocol address being within the third Internet Protocol address range;

determining, by the virtual private network controller, that a third virtual private network is associated with a fourth Internet Protocol address range that overlaps with the third Internet Protocol address range and/or the second Internet Protocol address range;

selecting, by the virtual private network controller and in response to the determining, a fifth Internet Protocol address range that does not overlap with the third Internet Protocol address range and does not overlap with the second Internet Protocol address range;

remapping, by the virtual private network controller and in response to the selecting, the third virtual private network from the fourth Internet Protocol address range to the fifth Internet Protocol address range; and routing, by the virtual private network controller and based at least on the third Internet Protocol address range, the second Internet Protocol address range, and the fifth Internet Protocol address range, traffic between the first virtual private network, the second virtual private network, and the third virtual private network.

2. The system of claim 1, wherein the remapping to the third Internet Protocol address range and the remapping to the fifth Internet Protocol address range enable a routing of traffic between endpoints in the first virtual private network, the second virtual private network, the third virtual private network, and a fourth virtual private network.

3. The system of claim 1, wherein the first virtual private network is remapped to the third Internet Protocol address range and the third virtual private network is remapped to the fifth Internet Protocol address range in order to interconnect the first virtual private network, the second virtual private network, and the third virtual private network.

4. The system of claim 1, wherein the detecting comprises detecting that the first endpoint in the first virtual private network and the second endpoint in the second virtual private network share a same Internet Protocol address prior to the remapping to the third Internet Protocol address range.

5. The system of claim 1, wherein the remapping to the fifth Internet Protocol address range enables the first endpoint in the first virtual private network and the second endpoint in the second virtual private network to consume a service corresponding to a third endpoint in the third virtual private network.

6. The system of claim 1, wherein the operations further comprise determining that the first virtual private network is deployed on a first cloud platform, the second virtual private network is deployed on a second cloud platform, and/or the third virtual private network is deployed on a third cloud platform.

7. The system of claim 6, wherein the first cloud platform, the second cloud platform, and/or the third cloud platform are configured to provide infrastructure-as-a-service.

8. The system of claim 6, wherein the operations further comprise determining that the first cloud platform, the second cloud platform, and/or the third cloud platform comprise private cloud computing platforms deployed on on-premise cloud infrastructure and/or public cloud computing platforms deployed on third-party cloud infrastructure.

9. A computer-implemented method, comprising:

detecting, by a virtual private network controller, an overlap between a first Internet Protocol address range of a first virtual private network and a second Internet Protocol address range of a second virtual private network;

remapping, by the virtual private network controller and in response to detecting the overlap between the first Internet Protocol address range and the second Internet Protocol address range, the first virtual private network to a third Internet Protocol address range that does not overlap with the second Internet Protocol address range of the second virtual private network, the remapping including assigning, by the virtual private network controller to a first endpoint in the first virtual private network, a first Internet Protocol address that differs from a second Internet Protocol address of a second endpoint in the second virtual private network, the first Internet Protocol address being within the third Internet Protocol address range;

determining, by the virtual private network controller, that a third virtual private network is associated with a fourth Internet Protocol address range that overlaps with the third Internet Protocol address range and/or the second Internet Protocol address range;

selecting, by the virtual private network controller and in response to the determining, a fifth Internet Protocol address range that does not overlap with the third Internet Protocol address range and does not overlap with the second Internet Protocol address range;

remapping, by the virtual private network controller and in response to the selecting, the third virtual private network from the fourth Internet Protocol address range to the fifth Internet Protocol address range; and routing, by the virtual private network controller and based at least on the third Internet Protocol address range, the second Internet Protocol address range, and the fifth Internet Protocol address range, traffic between the first virtual private network, the second virtual private network, and the third virtual private network.

10. The method of claim 9, wherein the remapping to the third Internet Protocol address range and the remapping to the fifth Internet Protocol address range enable a routing of traffic between endpoints in the first virtual private network, the second virtual private network, the third virtual private network, and a fourth virtual private network.

11. The method of claim 9, wherein the first virtual private network is remapped to the third Internet Protocol address range and the third virtual private network is remapped to the fifth Internet Protocol address range in order to interconnect the first virtual private network, the second virtual private network, and the third virtual private network.

12. The method of claim 9, wherein the detecting comprises detecting that the first endpoint in the first virtual private network and the second endpoint in the second virtual private network share a same Internet Protocol address prior to the remapping to the third Internet Protocol address range.

13. The method of claim 9, wherein the remapping to the fifth Internet Protocol address range enables the first endpoint in the first virtual private network and the second endpoint in the second virtual private network to consume a service corresponding to a third endpoint in the third virtual private network.

14. The method of claim 9, wherein the operations further comprise determining that the first virtual private network is deployed on a first cloud platform, the second virtual private network is deployed on a second cloud platform, and/or the third virtual private network is deployed on a third cloud platform.

15. The method of claim 14, wherein the operations further comprise determining that the first cloud platform, the second cloud platform, and/or the third cloud platform comprise private cloud computing platforms deployed on on-premise cloud infrastructure and/or public cloud computing platforms deployed on third-party cloud infrastructure.

16. A non-transitory computer-readable medium storing instructions, which when executed by at least one data processor, result in operations comprising:

detecting, by a virtual private network controller, an overlap between a first Internet Protocol address range of a first virtual private network and a second Internet Protocol address range of a second virtual private network;

remapping, by the virtual private network controller and in response to detecting the overlap between the first Internet Protocol address range and the second Internet Protocol address range, the first virtual private network to a third Internet Protocol address range that does not overlap with the second Internet Protocol address range of the second virtual private network, the remapping including assigning, by the virtual private network controller to a first endpoint in the first virtual private network, a first Internet Protocol address that differs from a second Internet Protocol address of a second endpoint in the second virtual private network, the first Internet Protocol address being within the third Internet Protocol address range;

determining, by the virtual private network controller, that a third virtual private network is associated with a fourth Internet Protocol address range that overlaps with the third Internet Protocol address range and/or the second Internet Protocol address range;

selecting, by the virtual private network controller and in response to the determining, a fifth Internet Protocol address range that does not overlap with the third Internet Protocol address range and does not overlap with the second Internet Protocol address range;

remapping, by the virtual private network controller and in response to the selecting, the third virtual private network from the fourth Internet Protocol address range to the fifth Internet Protocol address range; and routing, by the virtual private network controller and based at least on the third Internet Protocol address range, the second Internet Protocol address range, and the fifth Internet Protocol address range, traffic between the first virtual private network, the second virtual private network, and the third virtual private network.

* * * * *